US012611847B2

(12) United States Patent
Cieslinski et al.

(10) Patent No.: US 12,611,847 B2
(45) Date of Patent: Apr. 28, 2026

(54) MATERIALS, COMPOSITIONS, AND METHODS FOR THE FORMATION OF COMPOSITE ARTICLES

(71) Applicants: BASF SE, Ludwigshafen am Rhein (DE); University of Tennessee Research Foundation, Knoxville, TN (US); UT-Battelle, LLC, Oak Ridge, TN (US)

(72) Inventors: Mark Joseph Cieslinski, Wyandotte, MI (US); Mohamed Bouguettaya, Wyandotte, MI (US); Donald H. Campbell, Southfield, MI (US); Ryan Ginder, Knoxville, TN (US); Soydan Ozcan, Knoxville, TN (US); Uday K. Vaidya, Knoxville, TN (US)

(73) Assignees: UT-Battelle, LLC, Oak Ridge, TN (US); BASF-SE, Philadelphia, PA (US); University of Tennessee Research Foundation, Knoxville, TN (US)

( * ) Notice: Subject to any disclaimer, the term of this patent is extended or adjusted under 35 U.S.C. 154(b) by 399 days.

(21) Appl. No.: 18/042,058

(22) PCT Filed: Aug. 20, 2021

(86) PCT No.: PCT/US2021/046936
§ 371 (c)(1),
(2) Date: Feb. 17, 2023

(87) PCT Pub. No.: WO2022/040546
PCT Pub. Date: Feb. 24, 2022

(65) Prior Publication Data
US 2023/0219326 A1     Jul. 13, 2023

Related U.S. Application Data

(60) Provisional application No. 63/068,714, filed on Aug. 21, 2020.

(51) Int. Cl.
B32B 27/12     (2006.01)
B32B 5/02     (2006.01)
B32B 19/02     (2006.01)
B32B 19/04     (2006.01)
B32B 27/34     (2006.01)

(52) U.S. Cl.
CPC .............. *B32B 19/02* (2013.01); *B32B 5/022* (2013.01); *B32B 19/045* (2013.01); *B32B 27/12* (2013.01); *B32B 27/34* (2013.01); *B32B 2260/023* (2013.01); *B32B 2260/046* (2013.01); *B32B 2262/106* (2013.01); *B32B 2307/732* (2013.01); *B32B 2377/00* (2013.01); *B32B 2605/08* (2013.01)

(58) Field of Classification Search
CPC ....... A23B 4/0053; A23L 13/55; A23L 13/76; A23L 13/00; B32B 19/02; B32B 19/045; B32B 19/06; B32B 2260/021; B32B 2260/023; B32B 2260/046; B32B 2262/106; B32B 2272/00; B32B 2307/40; B32B 2307/732; B32B 2307/738; B32B 2377/00; B32B 2605/00; B32B 2605/003; B32B 2605/08; B32B 27/12; B32B 27/34; B32B 5/022; Y02W 30/62
See application file for complete search history.

(56) References Cited

U.S. PATENT DOCUMENTS 5,085,743 A * 2/1992 Reddy .................... G01N 27/30
205/785.5
2011/0244743 A1 10/2011 Scherzer et al.

FOREIGN PATENT DOCUMENTS

| CN | 109777087 A | 5/2019 |
|---|---|---|
| GB | 2557299 A | 6/2018 |
| JP | H10-151708 A | 6/1998 |
| JP | 2017-133131 A | 8/2017 |
| JP | 2020-040268 A | 3/2020 |

OTHER PUBLICATIONS

International Search Report and Written Opinion from corresponding PCT International Application No. PCT/US2021/046936 dated Nov. 5, 2021.
International Preliminary Report on Patentability from corresponding PCT International Application No. PCT/US2021/046936 dated Mar. 2, 2023.

* cited by examiner

*Primary Examiner* — Lawrence D Ferguson
(74) *Attorney, Agent, or Firm* — Edna I. Gergel; IP Group of DLA Piper LLP (US)/ BASF

(57) ABSTRACT

Provided herein are composite materials comprising a layup consisting of one or more surfacing sheets comingled with a carbon fiber non-woven mat. The surfacing sheet may comprise polyamide-6 and the carbon fiber non-woven mat may comprise carbon fibers that have been recycled. The surfacing sheets comprise sub-micron scale particles for reducing the thermal expansion coefficient of the surfacing sheets. The resulting layup is suitable for use in the formation of articles, particularly articles requiring a smooth finish absent of defects caused by underlying surfaces having irregular compositions or textures.

19 Claims, No Drawings

MATERIALS, COMPOSITIONS, AND METHODS FOR THE FORMATION OF COMPOSITE ARTICLES

The United States Government has rights in this invention pursuant to contract no. DE-AC05-00OR22725 between the United States Department of Energy and UT-Battelle, LLC.

FIELD OF THE DISCLOSURE

The present disclosure generally relates to materials, compositions and methods of utilizing materials and compositions to form composite layups, wherein such composite layups are suitable for use with articles such as those constructed from thermoplastic and/or material fibers, such as carbon, glass or natural fibers. The composite layups are useful for enabling a final finish displaying durable, smooth surfaces that minimize the visible effects of defects such as those caused by materials used to form the articles, including carbon fibers. In certain embodiments, the composite layups provided herein may be used to produce an automotive Class A surface finish when painted on a non-woven thermoplastic/carbon fiber reinforced composite intended for high volume automotive body panels.

DESCRIPTION OF THE RELATED ART

Ongoing trends in improved transportation sustainability and energy efficiency continue to drive interest in the manufacturing of lighter weight vehicles. The Center for Automotive Research projects a materials roadmap for average vehicle structure (body-in-white and closures) by curb weight per vehicle where the use of steel gradually declines in favor of lighter aluminum alloys and polymers/composites:

- 2020: 65% steel, 13% aluminum, 6% plastics/composites, 16% other
- 2030: 55% steel, 20% aluminum, 10% plastics/composites, 15% other
- 2040: 46% steel, 26% aluminum, 15% plastics/composites, 13% other [1].

Part of the reason for this materials trend is the rise of commercially relevant electric vehicles. Projections by BloombergNEF show that the incorporation of lighter weight materials, like low cost carbon fiber, can reduce cost per vehicle by ~$1,000 at 30% incorporation to the vehicle structure [2]. With electric vehicles (BEV+PHEV) expected to make up —69% of just under 100 million project global vehicles sales by 2040, this represents a significant potential savings for automotive manufacturers in addition to the obvious benefits of improved fuel economy/vehicle range [2].

One emerging potential source of lower cost fiber reinforcement for performance polymer composites comes from carbon fiber (CF) recycling. To be recycled, CF scrap is size reduced (e.g., shredded) and processed to remove any previous resin systems yielding chopped or milled fiber for reuse in discontinuous fiber composite applications [3-5]. Resin removal in composite recycling typically is accomplished through some form of either pyrolysis or solvolysis processing [3-6]. While commercial recycled carbon fibers (rCF) are now becoming available to purchase on the open market, continued industry growth requires the demonstration of potential applications which can create much needed market pull for further scaling of recycling technologies.

One application of interest for rCF composites lies in the production of automotive paneling for vehicle lightweighting. To understand this, it is important to consider the core materials requirements for a vehicle body panel. The first design criterion for any panel is its bending stiffness and strength performance [7,8]. Materials are rated for selection using material indices $$\sqrt[3]{E}/\rho$$

for stiffness (where E is Young's modulus and $\rho$ is density) and $$\sqrt[2]{\sigma}/\rho$$

for strength (where $\sigma$ is tensile yield or failure strength and $\rho$ is again density) as described in detail by the works of Ashby, et. al. [7-9]. These indices normalize material mechanical properties by density such that panels of identical stiffness made with higher indexed materials will weigh less. High elastic modulus and strength are also desirable for avoiding issues such as oil canning, where elastic buckling from hand pressure can reverse the local curvature of a panel, and surface denting [7,8]. The second main design criterion is panel surface aesthetics which is a function of panel painting and surface finish. The highest visual grade surfaces within the automotive industry are referred to as Class A. While the definition of a Class A surface varies among automotive OEMs, product lines (e.g., luxury vs. economy vehicles), and parts (e.g., horizontal panel hoods vs. vertical panel fenders), all are formulated around different tolerances for surface roughness and waviness at different length scales which produce undesirable visual defects (e.g., dullness, orange peel) [7,8]. Beyond mechanical performance and surface quality, other metrics for panel design include: resistance to environmental exposure/corrosion, ease of machining and formability, material recyclability, and cost [7,8].

Traditional compression molding of thermoplastics can exhibit longer cycle times and higher energy consumption making it comparatively unattractive for automotive mass production; however, new developments in induction heated molding technology have shown the ability to resolve both issues with compression molding. For example, a previous U.S. Department of Energy study looking at induction tooling for aerospace, wind energy, and automotive manufacturing found a potential ~63% reduction in compression molding process energy with a 2-4 minute part cycle time [10]. Based on this performance, the study projected that ~1069 TJ of energy could have been saved by the automotive industry in 2015 [10]. For perspective, that amount of excess energy would be sufficient to power an average refrigerator for over 450,000 years (i.e., over 2.25× the accepted length of human existence on earth) [11].

One potential issue with fiber reinforced panels made in this manner is in achieving acceptable surface visual quality. Producing a Class A surface in fiber reinforced polymers has been a longstanding issue for the composites industry because the fiber networks embedded within the polymer matrix have a tendency to read through to the surface [12-14]. This fiber print through effect (FPTE) is especially problematic for automotive painting as the application of primer and clearcoat requires heating any composite substrate panel to +100° C. for accelerated curing. Heating is known to cause a panel's surface topography to change such that the surface appearance becomes distorted upon cooling, revealing the underlying fiber network [14]. A few sub-classes of composites, such as sheet molding compounds (SMC), have managed to reach Class A by altering their compositions near the composite surface coupled with a lower fiber content than structural SMCs [7,8]. However, thermoset-based composites SMCs have limited shelf-life, higher scrap rates, and do not lend themselves to further downcycling at end of life.

What is needed therefore, are improved methods and materials that enable the efficient production of fiber rein-forced panels having acceptable surface visual quality. What is particularly needed are improved methods that preferably utilize non-woven preform mats made from comingled rCF and polyamide-6 (PA6) fibers for automotive paneling hav-ing desirable mechanical and visual qualities.

Accordingly, there remains an opportunity to provide improved manufacturing methods and systems useful for utilizing rCF. There also remains an opportunity to provide improved methods of forming high quality articles for use in the automotive industry wherein such articles are light-weight and exhibit desirable mechanical and visual attri-butes. Furthermore, there remains an opportunity to provide novel and productive methods that enable the recycling carbon fiber and thermoplastic articles, and the like, result-ing in products and articles with improved utility and enhanced material functionality.

SUMMARY OF THE DISCLOSURE

Provided herein are novel materials, compositions and methods, for utilizing the same, that enable the production of composite layups for use as surfaces and surface finishes for use on a variety of articles, including but not limited to, non-woven thermoplastic/carbon fiber reinforced composite materials. The composite layups are desirable for use on articles composed of carbon fibers, including for example, automotive parts such as high volume body panels. The compositions may be applied by painting, spray painting or other methods know to those skilled in the art. In an aspect, the composite layups result in a smooth finish, enabling the end product to have a desirable appearance, one that is substantially clear of flaws or visibly obtrusive markings.

The use of carbon fiber and thermoplastic parts in a variety of industrial components and consumer goods is widespread as a result of the practicality of using such materials and because of their high level of functionality and ease of manufacture. Nevertheless, one particular negative aspect of using carbon fiber and thermoplastic parts is associated with the fact that oftentimes resulting parts are not visually appealing. As a result of the difference in thermal expansion coefficient (CTE) for carbon fiber and thermoplastics, their use as a composite has been limited to out-of-sight parts because when subjected to the painting process used in high volume manufacturing, traces of the carbon fiber are visible on the painted surface. Provided herein are novel methods and materials that enable the production of a composite layup used to manage the differ-ence in thermal expansion so that carbon fiber is not visible. Furthermore, the invention claimed herein also enables the improvement of the overall topology to meet Class A requirements (minimal surface defects, consistent color-ation, gloss, luster and smoothness) for automobiles.

In an embodiment, the layup consists of a comingled PA6 and CF non-woven mat (produced from chopped PA6 fibers and chopped carbon fibers) with well-dispersed fibers (mini-mal bundles and mostly isotropic in-plane fiber orientation).

The non-woven mat contains a high fiber loading (20-40 wt %) of chopped carbon fibers with lengths greater than approximately 10 mm which provides good overall dimen-sional stability in the part. In certain embodiments, the non-woven mat may be exclusively or include recycled carbon fiber. The consolidated thickness is approximately on the order of 1 mm A resin rich PA6 sheet is added as a surface layer on the order of 1 mm to the non-woven mat. In certain embodiments, the surfacing layer may be added to the top and bottom surfaces of the non-woven mat for symmetry and to minimize warpage. In certain embodi-ments, the surfacing layer may be added to only one surface of the non-woven mat for desired configuration. The sur-facing sheet may contain sufficiently small (sub-micron scale) particles (such as carbon-based fillers, mineral fillers or nanomaterials) to reduce the thermal expansion coeffi-cient of the surfacing sheet. The viscosity of the resin comingled with the carbon fibers in the non-woven mat can be an injection molding grade of moderate viscosity. In certain embodiments it may be desirable to have an extru-sion grade viscosity (high viscosity) for the surfacing layer which may be important for sheet forming and maintaining layer thickness during compression molding.

According to the methods described herein, molding of the layup with the unconsolidated non-woven and surfacing layers occurs within a compression molding tool. The tool may comprise a positive mold to prevent squeeze-out (flash) of the surfacing layer. The tool surface may be polished to impart a smooth surface on the molded part. The tool surface may be modified according to the desired finish of the final part. As contemplated herein, the non-woven and surfacing layers are formulated, designed and manufactured such that the consolidation and part formation occurs as a one step process. Molding of the part is demonstrated herein with an induction heated tool with rapid cooling to ensure a high-quality surface finish in a short cycle time. Specifically, in certain embodiments, the targeted PA6/CF composite was demonstrated to be formed with in a 4-minute cycle time for a 2-3 mm part. Other mold heating technologies (such as steam or oil heating) may be used as would be evident to one skilled in the art. In subsequent steps, the part may be finished depending on its ultimate purpose and function. In certain embodiments, painting of the resulting molded part may be performed using a low-temperature bake paint system designed for polyamide. Specifically, in a certain embodiment, one demonstration was performed using an 80° C. bake temperature which is adaptable to the high-volume automotive manufacturing process. The low-tem-perature bake reduces the dimensional changes of the ther-moplastic and carbon fiber, thus minimizing the effect of the CTE mismatch of the carbon fiber and PA6 (thermoplastic). As a reference, existing bake temperatures can reach upwards of 120° C., which would result in more dimensional changes of the carbon fiber and PA thermoplastic.

Accordingly, as a result of the novel processes described herein, the claimed methods enable the production of light-weight thermoplastic composite panels containing carbon fiber with no loss in aesthetics when compared to a painted steel incumbent. An advantageous aspect of the invention is that the composite is designed for compression molding into a final part in one step. The materials used herein may encompass the use of recycled carbon fiber and the final parts may also be recycled into molding compounds. In summary therefore, the present invention comprises energy efficient, fast cycle time compression molding via induction heating of comingled recycled carbon fiber and polyamide 6 non-wovens for sustainable lightweight articles, including for example, automotive paneling. As described in the Example, the potential of non-woven preform mats made from comingled rCF and polyamide-6 (PA6) fibers for automotive paneling was examined by molding test panels via induction heat compression molding. The consolidated rCF/PA6 composite parts were then tested for mechanical and visual surface quality and compared against reference materials currently used by the automotive industry.

DETAILED DESCRIPTION OF THE INVENTION

The present invention is described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. One skilled in the art will recognize that the embodiments of the invention can be used with any of the methods of the invention and that any methods of the invention can be performed using any of the embodiments of the invention. Embodiments comprising various features may also consist of or consist essentially of those various features. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as would be commonly understood or used by one of ordinary skill in the art encompassed by this technology and methodologies.

Texts and references mentioned herein are incorporated in their entirety.

Provided herein are improved methods and materials that enable the efficient production of fiber reinforced panels having acceptable surface visual quality. The improved methods described herein utilize non-woven preform mats made from comingled recycled carbon fiber (rCF) and polyamide-6 (PA6) fibers for automotive paneling having desirable mechanical and visual qualities.

To meet panel design criteria, long rCF fibers can be co-mingled with engineering-grade thermoplastic fibers to produce rolls of impregnated non-woven mats readily compression moldable into reinforced panels. This technique is advantageous from a manufacturing sustainability standpoint as the non-woven trimmings can be readily put back through the original mat forming process, virtually eliminating all process scrap. The resulting reinforced thermoplastic panels can themselves also be recycled at end of life;

either through regrind for direct remolding or through the same pyrolysis or solvolysis processing used to recover the recycled fiber originally.

Provided herein are composite materials comprising a layup consisting of one or more surfacing sheets with a non-woven mat wherein the non-woven mat comprise fibers, and wherein the fibers may comprise carbon fibers, glass fibers and/or natural fibers and the like. The fibers may be well-dispersed in the non-woven mat, wherein the non-woven mat has minimal fiber bundles, wherein the fibers are in mostly isotropic in-plane fiber orientation and/or wherein the fibers are in random in-plane orientation. The non-woven mat may contain a high fiber loading (20-40 wt %) of chopped fibers as well as other components such as stabilizer, fillers etc. The chopped fibers comprise lengths of approximately 5-80 mm, 5-60 mm, 5-40 mm, 5-15 mm, 5-10 mm, or 10 mm. The fibers comprise recycled fibers or reclaimed fibers. In various embodiments, the non-woven mat has a thickness of approximately 1 mm, 2 mm, 3 mm, 4 mm, 5 mm, 6 mm, 7 mm, 8 mm, 9 mm, or 10 mm and may be customized according to the application thereof.

In certain embodiments, the composite material claimed herein may comprise one or more surfacing sheets surfacing layer comprising a polymer or compatible polymer that is the same as the polymer in the non-woven mat. For example, the one or more surfacing sheets surfacing layer may comprise polyamide-6.

In certain embodiments, the composite materials of the invention comprise one or more surfacing sheets further comprising sub-micron scale particles for reducing the thermal expansion coefficient of the surfacing sheets. The sub-micron scale particles may comprise carbon-based fillers, mineral fillers or nanomaterials. The surfacing sheet may be considered to be resin rich polyamide-6. In addition, the viscosity of the resin rich polyamide-6 may comprise injection molding grade of moderate viscosity; including but not limited to Ultramid® B3. Furthermore, the viscosity of the resin rich polyamide-6 may comprise extrusion grade viscosity; including but not limited to Ultramid® B4.

In certain embodiments, the non-woven mat further comprises thermoplastic components. The thermoplastic component may comprise the thermoplastic component in any form including thermoplastic fibers or thermoplastic powder.

The non-woven mat may comprise one or more rigid consolidated sheets. In certain embodiments, the surfacing sheet is present as a layer on one surface of the non-woven mat, or as a layer on both surfaces of the non-woven mat. The surfacing sheet may have a thickness of approximately 1 mm, 2 mm, 3 mm, 4 mm, 5 mm, 6 mm, 7 mm, 8 mm, 9 mm, or 10 mm.

In certain embodiments, a compression molding tool may be used to mold the layup. The compression molding tool may comprise a positive mold, the compression molding tool may comprise a polished molding surface to impart a smooth finish, the compression molding tool may comprise a configured molding surface to impart a configured finish, and/or the configured molding surface comprises a pattern.

In certain embodiments, the surfacing sheets and non-woven mat may be manufactured into a molded part as a one step process. The process may further comprise the use of an induction heated tool with rapid cooling. The composite material may be painted using a low-temperature bake paint system.

In certain embodiments, the composite layup further comprises a resin, the resin may comprise a thermoplastic compound or a polymer. The polymer may comprise additives, heat stabilizers, flame retardents, compatibilizers, waxes and/or pigments.

The resulting articles may be of various sizes, shapes, and thickness. For example, the articles can be configured to mimic conventional composite articles, such as panels. The article can also be of various complex shapes, such as automotive parts, including but not limited to, header and nose panels, hoods, tailgates and trunk lids, bumpers, doors, fenders, radiator supports and headlight mounts. The article can include one or more layers. For example, if the article is a support structure, the article can include one layer, e.g. a core layer, two layers, e.g. a core layer and a face/fascia layer, or three or more layers, e.g. a core layer and two fascia layers.

Without being bound or limited to any particular theory, it is thought that presence of the fiber component, such as a carbon fiber component, improves the durability and utility of the composite article. Furthermore, it is thought that the combined presence of the non-woven preform mats made from comingled rCF and polyamide-6 (PA6) fibers enables the resulting composite article to have properties desirable for automotive components and parts.

The following examples is intended to illustrate and not to limit the disclosure.

EXAMPLES

Non-Woven rCF and Polyamide-6 (PA6) Fiber Preform Mats

In this study, the potential of non-woven preform mats made from comingled rCF and polyamide-6 (PA6) fibers for automotive paneling was examined by molding test panels via induction heat compression molding. The consolidated rCF/PA6 composite parts were then tested for mechanical and visual surface quality and compared against reference materials currently used by the automotive industry.

Materials & Methodology

Rolls of co-mingled rCF/PA6 non-woven mat were produced at 40% carbon fiber content by weight as the starting preform material for this study's molding trials. The rolls were produced at an areal density of 350 gsm from chopped recycled carbon fiber and from chopped PA6 fiber supplied by BASF Corp. A surfacing layer was created from PA6 and included 10% by weight carbon black. The surfacing layer was an extruded sheet with a nominal thickness of 1.2 mm Consolidated composite panels for mechanical testing were produced using a Beckwood 100-ton press outfitted with an induction heated compression molding tool from RocTool Inc. For molding, non-woven preforms and surfacing layers were cut to the shape of the mold cavity (approximately 300 mm×500 mm) and hand laid up inside the tool before heating and molding. One surfacing layer was placed on the top and bottom of the stack of non-woven mats to create a symmetric layup. The RocTool induction equipment was set to heat the tool to a nominal molding temperature of ~260° C., the composite heat soaked for 80 seconds, followed by the application of tonnage for 60 seconds at molding temperature then cooling under tonnage to a demold temperature of 80° C.

Mechanical test bars (nominally 100 mm×12.5 mm×0.7 mm) were water jet cut from molded parts and subjected to 2 mm/min constant tensile displacement rate tests based on ASTM D3039 [15]. Mechanical testing was conducted using an MTS Criterion 45 UTS load frame with a 100 kN load cell. Specimens for surface quality analysis were cut into test panels approximately 100 mm×300 mm and then painted using a standard BASF automotive painting system for PA6 which utilized a black primer basecoat and a 2K clearcoat. The coatings were cured at a lower bake temperature of 80° C. to minimize part surface topographical changes while still simulating a realistic automotive painting process. The painted surfaces were then scanned with an automotive industry standard BYK Wavescan device to determine relative surface waviness at long and short wavelengths. A BYK Wavescan uses a laser to measure and categorize surface waviness/roughness over 0.1-30 mm. These values can be reported as long wavelength range 1.2-12 mm (LW) and short wavelength range 0.3-1.2 mm (SW) scalar intensities or over a finer structure spectrum: du <0.1 mm, Wa 0.1-0.3 mm, Wb 0.3-1 mm, We 1-3 mm, Wd 3-10 mm, We 10-30 mm [16]. The specific Class A surface definitions vary by automotive OEM, but for the purposes of this study a simple Class A surface threshold was defined as LW<=10 and SW<=20.

Results & Discussion

Mechanical Performance

The mechanical test specimens yielded a Youngs Modulus of 10.5 GPa and a tensile strength 127.6 MPa. This performance can be explained by the overall averaging of the polyamide resin and carbon fiber content amongst the cross-section of the test specimen. Furthermore, the emphasis to produce short cycle time parts for automotive applications may also contribute to the mechanical performance described here. Nonetheless, this level of performance achieved by the thermoplastic composite is consistent with thermoset SMC technologies used for automotive body panel application.

Painted Surface Quality

The composite panel was painted alongside a primed cold rolled steel panel typically used for paint evaluation as a benchmark for comparison, in addition to the longwave and shortwave targets. The use of a steel benchmark panel also confirms that this painting trial is consistent with typical painting trials. The painted steel benchmark panel had a longwave value of 5.8 and shortwave value of 12.9 while the carbon fiber composite panel had values of 9.5 and 11.4 for SW and LW, respectively. The surface quality of composite panel is below the target values for SW and LW and is similar to the steel benchmark panel. Furthermore, the surface finish appears smooth with no visible traces of fiber or fiber bundles from the underlying carbon fiber. With these criteria met, it is feasible to say that a carbon fiber/polyamide-6 composite can be produced in a short cycle time and yield a Class A surface finish when painted.

Conclusion

Reducing weight is an important strategy for improving the fuel economy and range of both electric and traditional vehicles. Fiber reinforced polymer composites offer an attractive weight reduction option for automotive body panel applications by being able to offer needed stiffness, durability, and lower weight. The emergence of rCF as a commercially available form of fiber reinforcement now offers the promise of achieving the benefits of composites at a significantly reduced price point with a more sustainable supply chain. In this example a commercially scalable non-woven consisting of rCF (40 wt %) and PA6 fiber (60 wt %) was molded with the addition of a resin rich surfacing sheet via induction heating to demonstrate its potential for automotive exterior body paneling. Characterization of these panels revealed:

rCF/PA6 paneling was compression moldable into panels via induction heating, resulting in significant reductions in cycle time that approach timings acceptable for automotive mass production, Painted rCF/PA6 panels exhibited a Class A surface finish despite the existence of carbon fiber and potentially large carbon fiber bundles in the substrate.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described herein in an illustrative manner, and it is to be understood that the terminology which has been used is intended to be in the nature of words of description rather than of limitation. Many modifications and variations of the present disclosure are possible in light of the above teachings. The present disclosure may be practiced otherwise than as specifically described within the scope of the appended claims. The subject matter of all combinations of independent and dependent claims, both single and multiple dependent, is herein expressly contemplated.

REFERENCES

[1] Modi S, Vadhavkar A. Technology Roadmap: Materials and Manufacturing. Center for Automotive Research. https://www.cargroup.org/wp-content/uploads/2019/10/Technology-Roadmap_Materials-and-Manufacturing.pdf [Accessed 14 May 2020].
[2] Attwood J. Composites in energy, transport, and manufacturing. BloombergNEF. Presented at IACMI Winter 2020 Members Meeting. 22 Jan 2020.
[3] Pickering S J. Recycling technologies for thermoset composite materials—current status. Compos Part A 2006; 37:1206-1215.
[4] Asmatulu E, Twomey J, Overcash M. Recycling of fiber-reinforced composites and direct structural composite recycling concept. J Compos Mater 2014; 48:593-608.
[5] Oliveux G, Dandy L O, Leeke G A. Current status of recycling of fibre reinforced polymers: Review of technologies, reuse and resulting properties. Prog Mater Sci 2015; 72:61-99.
[6] Ginder R S, Ozcan S. Recycling of Commercial E-glass Reinforced Thermoset Composites via Two Temperature Step Pyrolysis to Improve Recovered Fiber Tensile Strength and Failure Strain. Recycling 2019; 4:24-35.
[7] Mallick P K. Materials, Design and Manufacturing for Lightweight Vehicles. 2010.
[8] Sherman A M. Encyclopedia of Materials: Science and Technology. 2001.
[9] Ashby M F. Materials Selection in Mechanical Design. Butterworth Heinemann. Oxford 1999.
[10] Matsen M. Induction Consolidation/Molding of Thermoplastic Composites Using Smart Susceptors. The Boeing Company. https://www.osti.gov/biblio/1043163 [Accessed 5 May 2020].
[11] Estimating Appliance and Home Electronic Energy Use. US Department of Energy. https://www.energy.gov/energysaver/save-electricity-and-fuel/appliances-and-electronics/estimating-appliance-and-home [Accessed 5 May 2020].
[12] Kunze J, Mahrholz T, Sinapius M. Identification and quantitation of processing parameters controlling the surface quality of carbon fibre-reinforced composites. J Rein Plas Compos 2016; 35:638-654.
[13] Neitzel M., Blinzler M., Edelmann K, Hoecker F. Surface Quality Characterization of Textile-Reinforced Thermoplastics. Polymer Compos 2000; 21:630-635.
[14] Campbell D H. Challenges in Achieving Class A Finish on Carbon Fiber Composites. BASF Corp. https://www.slideshare.net/basf/cf-paintability-linked-in [Accessed 4 Jan. 2018].
[15] ASTM D3039 Standard Test Method for Tensile Properties of Polymer Matrix Composite Materials. https://www.astm.org/Standards/D3039 [Accessed 28 Nov. 2017].
[16] BYK Wavescan Technical Datasheet. https://www.byk.com/fileadmin/byk/support/instruments/technical_information/datasheets/E nglish/Appearance/Orange%20Peel/Visual_Evaluation_and_instrumental_Measurement_of_Orange_Peel_and-DOI.pdf [Accessed 5 May 2020].

What is claimed is:

1. A composite material comprising a layup consisting of one or more surfacing sheets with a carbon fiber non-woven mat, wherein the carbon fiber non-woven mat comprises chopped fibers, wherein the carbon fiber non-woven mat comprises 20-40 wt % of chopped carbon fibers, and wherein the chopped fibers comprise lengths of approximately 5-80 mm, 5-60 mm, 5-40 mm, 5-15 mm, 5-10 mm, or 10 mm.

2. The composite material of claim 1, wherein the chopped fibers are well-dispersed in the non-woven mat, wherein the non-woven mat has minimal fiber bundles, wherein the chopped fibers are in mostly isotropic in-plane fiber orientation and/or wherein the chopped fibers are in random in-plane orientation.

3. The composite material of claim 1, wherein the chopped carbon fibers comprise recycled carbon fibers or reclaimed carbon fibers.

4. The composite material of claim 1, wherein the carbon fiber non-woven mat has a thickness of approximately 1 mm, 2 mm, 3 mm, 4 mm, 5 mm, 6 mm, 7 mm, 8 mm, 9 mm, or 10 mm.

5. The composite material of claim 4, wherein the one or more surfacing sheets comprise a polymer, and wherein the non-woven mat comprises a polymer that is the same as the polymer in the one or more surfacing sheets.

6. The composite material of claim 5, wherein the one or more surfacing sheets further comprise sub-micron scale particles for reducing the thermal expansion coefficient of the surfacing sheets.

7. The composite material of claim 6, wherein the sub-micron scale particles comprise carbon-based fillers, mineral fillers or nanomaterials.

8. The composite material of claim 5, wherein the polymer is resin rich polyamide-6.

9. The composite material of claim 8, wherein the viscosity of the resin rich polyamide-6 comprises injection molding grade of moderate viscosity or extrusion grade viscosity.

10. The composite material of claim 1, wherein the surfacing sheet is present as a layer on one surface or both surfaces of the carbon fiber non-woven mat.

11. The composite material of claim 1, wherein the surfacing sheet has a thickness in the range of approximately 0.1 mm, 0.2 mm, 0.3 mm, 0.4 mm, 0.5 mm, 0.6 mm, 0.7 mm, 0.8 mm, 0.9 mm, 1 mm, 2 mm, 3 mm, 4 mm, 5 mm, 6 mm, 7 mm, 8 mm, 9 mm, to 10 mm.

12. The composite material of claim 1, further comprising resin.

13. The composite material of claim 12, wherein the resin comprises a thermoplastic compound or a polymer.

14. The composite material of claim 13, wherein the polymer comprises additives, heat stabilizers, flame retardants, compatibilizers, waxes and/or pigments.

15. A composite material comprising a layup consisting of one or more surfacing sheets with a non-woven mat wherein the non-woven mat comprises fibers, wherein the non-woven mat contains 20-40wt % of chopped fibers, wherein the chopped fibers comprise lengths of approximately 5-80 mm, 5-60 mm, 5-40 mm, 5-15 mm, 5-10 mm, or 10 mm.

16. The composite material of claim 15, wherein the fibers comprise carbon fibers, glass fibers, polyamide-6 fibers, and/or natural fibers.

17. The composite material of claim 15, wherein the fibers are well-dispersed in the non-woven mat, wherein the non-woven mat has minimal fiber bundles, wherein the fibers are in mostly isotropic in-plane fiber orientation and/or wherein the fibers are in random in-plane orientation.

18. The non-woven mat of claim 1, further comprising chopped polyamide-6 fibers.

19. A composite material comprising a layup consisting of one or more surfacing sheets and a carbon fiber non-woven mat, wherein the carbon fiber non-woven mat comprises chopped fibers comprising:

40 wt % of chopped carbon fibers;

60 wt % of chopped polyamide-6 fibers;

wherein the one or more surfacing sheets comprise polyamide-6 and carbon black, wherein the chopped carbon fibers are well-dispersed in the non-woven mat, wherein the non-woven mat has minimal carbon fiber bundles, and wherein the chopped fibers comprise lengths of approximately 10 mm.

* * * * *